US010303381B2

(12) United States Patent
Dreher et al.

(10) Patent No.: US 10,303,381 B2
(45) Date of Patent: May 28, 2019

(54) SAFETY SENSOR

(71) Applicant: SICK AG, Waldkirch (DE)

(72) Inventors: Felix Dreher, Waldkirch (DE); Patrick Vollmer, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 15/268,879

(22) Filed: Sep. 19, 2016

(65) Prior Publication Data

US 2017/0168743 A1 Jun. 15, 2017

(30) Foreign Application Priority Data

Dec. 11, 2015 (EP) .................................. 15199628

(51) Int. Cl.
*G06F 12/00* (2006.01)
*G06F 3/06* (2006.01)
(Continued)

(52) U.S. Cl.
CPC .......... *G06F 3/0622* (2013.01); *B65G 43/00* (2013.01); *F16P 3/144* (2013.01); *G01V 8/20* (2013.01);
(Continued)

(58) Field of Classification Search
CPC .... G06F 3/0622; G06F 3/0659; G06F 3/0683; B65G 43/00; G01V 8/20
See application file for complete search history.

(56) References Cited

U.S. PATENT DOCUMENTS 4,115,847 A * 9/1978 Osder .................. B64C 13/503
244/194
6,009,453 A * 12/1999 Sakaki ................ G06F 12/1441
711/E12.101
(Continued)

FOREIGN PATENT DOCUMENTS

| DE | 10201894 B4 | 3/2010 |
| DE | 202007019467 U1 | 12/2012 |
| EP | 2853929 A1 | 4/2015 |

OTHER PUBLICATIONS

Search Report dated Jun. 23, 2016, issued in corresponding European Application No. 15199628, with English translation.

*Primary Examiner* — Mark A Giardino, Jr.
(74) *Attorney, Agent, or Firm* — Nath, Goldberg & Meyer; Jerald L. Meyer; Stanley N. Protigal (57) ABSTRACT

A method having a safety sensor and a safety sensor having at least one first evaluation unit having a first evaluation program, and at least one second evaluation unit having a second evaluation program. A two-channel system is formed with each evaluation unit being connected to a respective random access memory, and with each evaluation unit having a respective program memory, with a bidirectional communication channel being arranged between the evaluation units. A cross-comparison of the evaluation results can be carried out between the evaluation units, with a user program being able to be stored in at least one of the two program memories and/or in one of the two random access memories, with at least that evaluation unit which executes the user program having a memory protection device which is configured to restrict memory access of the user program to a defined memory region within the random access memory.

15 Claims, 5 Drawing Sheets

(51) Int. Cl.
*F16P 3/14* (2006.01)
*G01V 8/20* (2006.01)
*B65G 43/00* (2006.01)
*G06F 13/00* (2006.01)
*G06F 13/28* (2006.01)

(52) U.S. Cl.
CPC .......... *G06F 3/0659* (2013.01); *G06F 3/0683* (2013.01)

(56) References Cited

U.S. PATENT DOCUMENTS

| | | | |
|---|---|---|---|
| 2004/0124341 A1* | 7/2004 | Parstorfer | G01V 8/20 250/221 |
| 2010/0127158 A1 | 5/2010 | Scheiber et al. | |
| 2012/0036493 A1 | 2/2012 | Moosmann et al. | |

* cited by examiner

SAFETY SENSOR

The present invention relates to a safety sensor in accordance with the preamble of claim 1 and to a method using a safety sensor in accordance with the preamble of claim 10.

It is a substantial challenge for the development of new safety sensors, in particular those of an upper performance segment, and for their successful positioning in the market to generate significant added benefits for customers for as little additional cost as possible in order to delineate oneself from the competition.

A substantial trend in relation to industry 4.0 is the decentralization of data processing or of data pre-processing in industrial systems. It is increasingly not possible either in an organizationally sensible or technically efficient manner to record and manage a flood of data acquired by an innumerable number of sensors in a centralized manner.

One example of this is represented by simple light barriers which are used for counting light path interruptions, for example by material falling fast through the light path. It is very complex and/or expensive at a correspondingly high switching frequency to report the binary light path state signal in a classical manner via a switch line to the central system control, to read it in there via an input scanned at a very high frequency and thus expensive and prone to defects and to increment a counter in a control program on a flank recognition.

Safety light curtains having different stages of complexity of protected field evaluation functions are known, wherein these protected field evaluations always take place in a substantially safety-related manner, for example in two channels, and wherein the result is output via a suitable safety interface, for example via an OSSD signal or via a safe bus system. Only the most simple non-safe additional information, for example contamination warnings, are additionally output via non-safety related interfaces in accordance with the prior art of safety light curtains.

Simple, non-safety related sensors are furthermore known having fixedly predefined or slightly configurable data pre-processing, for example the counting of light path interruptions in light barriers and output or accessibility of the pre-processed data via inexpensive, low-performance interfaces, in particular an IO link.

If comprehensive sensor data of a safety sensor, for example beam data of a safety light grid, such as have previously been aimed for in part, are output completely for customized processing in a control, a very high-performance and thus expensive data interface is necessary for this purpose. This circumstance is exacerbated further if the data are output in a safety related manner since then a substantial overhead is necessary to ensure the data integrity of the data volume beyond the actual payload. The complete two-channel preparation of the data to be output in the sensor in this case not least requires very powerful two-channel hardware. Such a solution thus as a rule becomes economically uninteresting in comparison with a parallel use of a simple safety sensor and of a further automation sensor.

Safe and non-safe sensors are, for example, arranged in direct proximity with one another in accordance with the prior art in some applications and detect the same or very similar information, wherein the signals of the safe sensors are, however, only utilized for personal protection and the non-safe sensors are only used for automation functions. The safety sensors only serve for protection against crushing body parts. The automation light grids only serve for measuring the goods or containers introduced. In the worst case, the sensors could even interfere with one another.

EP 2 853 929 A discloses an optoelectronic safety sensor having an integrated programmable logic controller for a logical evaluation of logical state variables which are derived from measured signals.

DE 102 01 894 B4 discloses a sensor system having an article detection sensor, wherein data can be read into the article detection sensor, and wherein the control device of the article detection sensor has a programmable logic unit by which the data read in by the sensor can be logically linked in a manner freely selectable by the user.

It is an object of the invention to provide a flexible solution in safety sensors for a decentral pre-processing of non-safety related additional data for automation purposes for very small additional costs and thereby to provide an improved safety sensor, wherein the additional data are provided in a simple manner.

The object is satisfied by a safety sensor including at least one first evaluation unit having a first evaluation program, and at least one second evaluation unit, having a second evaluation program. A two-channel system is formed, with each evaluation unit being connected to a random access memory and each evaluation unit having a program memory, with a bidirectional communication channel being arranged between the evaluation units. A cross-comparison of the evaluation results can be carried out between the evaluation units, with a user program being able to be stored in at least one of the two program memories and/or in one of the two random access memories. The at least one of the evaluation units which executes the user program has a memory protection device which is configured to restrict a memory access of the user program to a defined memory region within the random access memory.

The object is further satisfied by a method using a safety sensor including at least one first evaluation unit, having a first evaluation program and at least one second evaluation unit, having a second evaluation program. A two-channel system is formed, with each evaluation unit being connected to a random access memory and each evaluation unit having a program memory, with a bidirectional communication channel being arranged between the evaluation units. A cross-comparison of the evaluation results can be carried out between the evaluation units, with a user program being stored in at least one of the two program memories and/or in one of the two random access memories. The at least one of the evaluation units which executes the user program has a memory protection device which restricts a memory access of the user program to a defined memory region within the random access memory.

The evaluation program is firmware. The evaluation program is characterized in that this program is a tested, closed program which, for example, corresponds to the safety provisions of safety standards of, for example, EN61496 or EN61508 or similar safety standards.

The user program (also referred to herein as an application program) controls an application, in particular an industrial application, for example a measurement system, a sorting plant, a conveying plant or the like. The user program is characterized in that it is typically prepared by a user of the safety sensor and not by the manufacturer of the latter. The user program typically also includes application data which are likewise provided by the user. The application data are, for example, production data, measurement data, storage data, etc.

In accordance with the invention, the user program is executed directly by the respective evaluation unit of the safety sensor. This is substantially simpler and more efficient than the solutions in the prior art, since, for example, a counting of beam interruptions can be carried out directly in the evaluation unit and the count can, for example, be transmitted at a much lower transmission rate over a simple interface.

The evaluation in accordance with the invention of the user program furthermore has substantial potential to implement user-specific automation solutions without having to make any changes to the safety sensor, whereby the safety sensor can be used in a more versatile manner.

Provision is made in accordance with the invention that the safety sensor has, in addition to safety-related outputs, so-called "output safety switching device" outputs, in brief OSSD outputs, further non-safety related outputs and non-safety related additional information can be output on these non-safety-related outputs for automation purposes.

In accordance with the invention, a so-called sandbox is generated within the safe evaluation program of the evaluation unit in which a user program of almost any design or user programs of almost any design can be operated without impairing the functional safety of the safety sensor. The user program has a direct and fast access to comprehensive operating data of the safety sensor without any additional requirements of expensive, high-performance interfaces such as would still be required in the prior art. The user program can evaluate these operating data in an application specific manner and can output results data calculated therefrom via a low-performance, inexpensive interface, for example to a downstream automation control of a system.

In accordance with the invention, the user program can, for example, be stored in the program memory of the other channel or of the second evaluation unit and the user program is transmitted over the communication channel into the random access memory of the first evaluation unit. This naturally also applies conversely.

Provision can optionally be made in accordance with the invention that the input data and output data of the user program takes place by direct access. In this respect, a specific memory region can be provided for the evaluation program and for the user program In a further development of the invention, the first evaluation unit is distinct with respect to the second evaluation unit. The evaluation units are different in this respect. For example, the evaluation units are formed by microcontrollers, microprocessors, digital signal processors, FPGAs, ASICs or similar components. Different microcontrollers are used, for example, as respective different evaluation units.

Systematic errors which are possibly present in the hardware of an evaluation unit are avoided by the use of different evaluation units. If, for example, individual memory cells are defective, the probability of an identical defect in a second evaluation unit of a different design is very small.

The safety of the safety sensor can be further increased with respect to a redundant design by diverse evaluation units.

In a further development of the invention, the first evaluation program is diverse from the second evaluation program. The evaluation programs are in this respect based on different source codes. The source code can in this respect have been prepared in an identical programming language, but the program design differs between the evaluation programs. Diverse evaluation programs could, however, also be prepared in different programming languages. Diverse evaluation programs can have been prepared, for example, by different developers or computer scientists.

Systematic errors which may possibly have been produced in the programming of the software are avoided by the use of different evaluation programs. If, for example, individual functions are defective, the probability of an identical functional defect in second evaluation program of different design is very low.

The safety of the safety sensor can be further increased with respect to a redundant design of the evaluation programs by diverse evaluation programs.

Provision is made in a further development of the invention that if an access attempt by the user program takes place to memory regions outside the permitted memory region, a memory protection violation program can be invoked by the evaluation unit which executes the evaluation program and the access to the memory region can be refused.

Accesses or access attempts of the user program are thereby checked by the evaluation program and the memory protection violation program is invoked on an non-permitted access. The memory protection violation program provides that the memory regions cannot be overwritten by the user program and outputs an error message where necessary.

In accordance with a preferred embodiment of the invention, the safety sensor is a safety light grid. A safety light grid serves for the securing of a hazardous zone by means of a monitored field. If, for example, an intrusion into the monitored field takes place, a dangerous movement is stopped.

The light grid comprises, for example, a transmission unit having a plurality of light transmitters and a reception unit having a plurality of light receivers and the first and second evaluation units. The monitored field or a protected field is formed between the transmission unit and the reception unit, with the light beams of the light transmitters of the transmission unit being incident onto oppositely disposed light receivers of the reception unit, whereby individual light barriers are formed.

Since the safety light grid has a plurality of beam axes arranged next to one another, objects can thus also be classified and measured. For example, permitted objects which are moved through the protected field can be scanned by the plurality of light barriers and an object classification can thus be carried out. For example, different method steps can be initiated in dependence on the detected objects. This non-safe object classification can be carried out, for example, by the user program in one of the evaluation units of the safety light grid or of the light grid. A safety application and an automation application can thereby be achieved by only one single safety light grid or light grid.

In a further development of the invention, a part of the random access memory can be assigned to the user program in the random access memory of the associated evaluation unit for utilization by the evaluation program, with the memory protection device being configured to restrict access of the user program only to this part of the random access memory.

Accesses of the user program to the random access memory can thereby be checked by the evaluation unit or by the evaluation program. The memory protection device restricts the access to prevent unauthorized accesses to ensure the protection of the evaluation program.

In a further development of the invention, the memory protection device can be checked cyclically. The proper function of the memory protection device is ensured by the cyclic check, whereby the safety of the evaluation program is improved.

In a further development of the invention, the user program can be executed cyclically by the evaluation program, with the evaluation program having a higher priority than the user program. The evaluation program thereby has complete control over the user program. The user program can only be executed when the evaluation program permits it and actively invokes the user program. The evaluation program is also always executed with a higher priority than the user program. The evaluation program is, for example, implemented with a higher interrupt priority or with a use of hardware timers such that the evaluation program is always executed with a higher priority than the user program and can always interrupt the user program after a maximum performance duration.

In accordance with a preferred embodiment of the invention, the evaluation program has a software abstraction layer which provides a selection of operating data of the safety sensor in a memory region readable for the user program. For example, the beam data of the light grid or the scan data of a laser scanner can be provided in this memory region.

In accordance with a further development of the invention, safe or safety-related data and/or non-safe or non-safety related data and/or signals from a system can be read into the evaluation unit via inputs of the safety sensor. They are, for example, muting signals for a muting application or output signals of the system for a measurement of objects. It can further, for example, also be a band speed signal or band coder signals. The reading in of such data is in particular sensible with complex applications since the safety sensor can process additional information in order, for example, to solve more complex applications.

These data and/or signals are accessible to the user program via the software abstraction layer in a further development of the invention. It is thus possible, for example, to prepare a 2D image of objects for the classification using the safety sensor or the safety light grid by means of a base speed signal or band position signal forwarded to the safety sensor, in particular to the safety light grid, when the objects are moved past the safety sensor or past the safety light grid.

In accordance with a preferred embodiment of the invention, the evaluation program has a software abstraction layer which accepts results data of the user program from a memory region writable for the user program and outputs it to an interface and/or keeps the results data ready for invoking for an external control. Subsequent controls can thereby be controlled or actuators can be controlled directly on the basis of the results of the user program.

In a further development of the invention, the user program can be stored in both program memories or in both random access memories, with both evaluation units being configured to execute the user program, with results of the user program being exchangeable between the evaluation units over the communication channel.

In accordance with this further development of the invention, the user program is configured as a safety-relevant, application-specific program. A safe user program can thereby be executed in the safety sensor.

For this purpose, each evaluation unit has a memory protection device which restricts memory access of the user program to a defined memory region within the random access memory.

The user program is then processed or executed in parallel on both evaluation units. The results of the user program are compared and evaluated via the evaluation programs of the two evaluation units over the communication channel. Differences are discovered as an error state.

The integrity of the user program is furthermore ensured by the evaluation program. For example, by the two-fold storage in both program memories and by a cyclic cross-comparison between the user programs on their execution. The user programs can furthermore be checked by check sums and corresponding checks.

In accordance with this further development of the invention, the results of the user program calculated in two channels can be output over a safety interface.

The invention will also be explained in the following with respect to further advantages and features with reference to the enclosed drawing and to embodiments. The Figures of the drawing show in.

In the following Figures, identical parts are provided with identical reference numerals.

Figure 1:
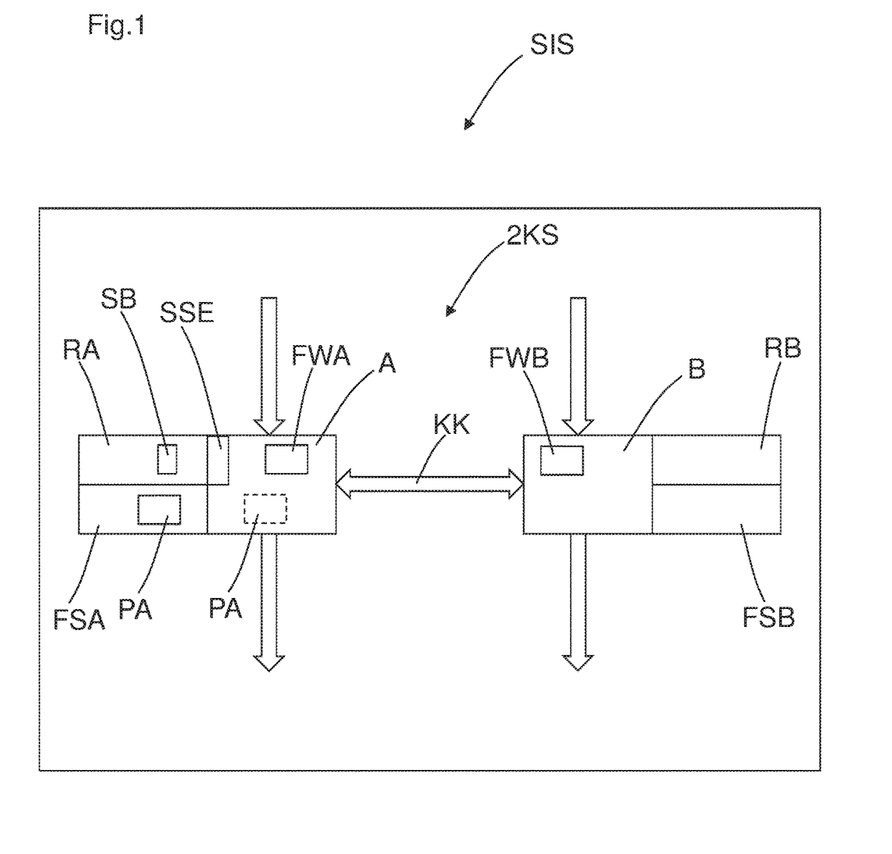
FIG. 1 diagrammatically illustrates a safety sensor with two evaluation units.

FIG. 1 shows a safety sensor SIS, including at least one first evaluation unit A having a first evaluation program FWA, and further including at least one second evaluation unit B having a second evaluation program FWB. A two-channel system 2KS is formed, with each evaluation unit A, B being connected to a respective random access memory RA, RB, and with each evaluation unit A, B having a respective program memory FSA, FSB, with a bidirectional communication channel KK being arranged between the evaluation units A, B. A cross-comparison of the evaluation results can be carried out between the evaluation units A, B, with a user program PA being able to be stored in at least one of the two program memories FSA, FSB and/or in one of the two random access memories RA, RB. The at least one of evaluation units A, B which executes the user program PA has a memory protection device SSE which is configured to restrict memory access of the user program PA, PB to a defined memory region SB within the random access memory RA, RB.

Figure 2:
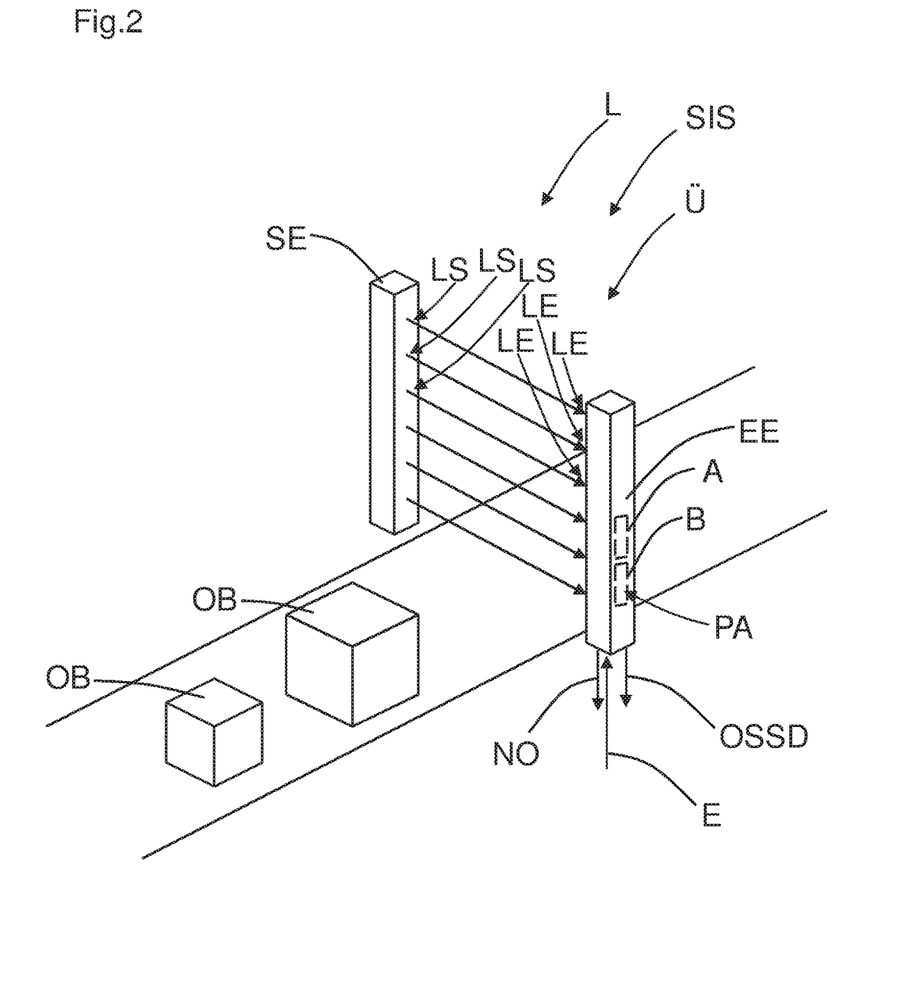
FIG. 2 shows a safety light grid.

In accordance with FIG. 2, the safety sensor SIS is a safety light grid L. A safety light grid L serves for the securing of a hazardous zone by means of a monitored field Ü. If, for example, an intrusion into the monitored field Ü takes place, a dangerous movement is stopped.

The light grid L comprises, for example, a transmission unit SE having a plurality of light transmitters LS and a reception unit EE having a plurality of light receivers LE and the first evaluation unit A and the second evaluation unit B. The monitored field Ü or a protected field is formed between the transmission unit SE and the reception unit EE, with the light beams of the light transmitters LS of the transmission unit SE being incident onto oppositely disposed light receivers LE of the reception unit EE, whereby individual light barriers are formed.

Since the safety light grid L has a plurality of beam axes arranged next to one another, objects OB can thus also be classified and measured. For example, permitted objects OB which are moved through the protected field can be scanned by the plurality of light barriers and an object classification can thus be carried out. For example, different method steps can be initiated in dependence on the detected objects OB. This non-safe object classification can be carried out, for example, by the user program PA in one of the evaluation units A, B of the safety light grid or of the light grid L. A safety application and an automation application can thereby be achieved by only one single safety light grid or light grid L.

The user program PA controls an application, in particular an industrial application, for example a measurement system, a sorting plant or, for example, a conveying plant in accordance with FIG. 2.

Figure 3:
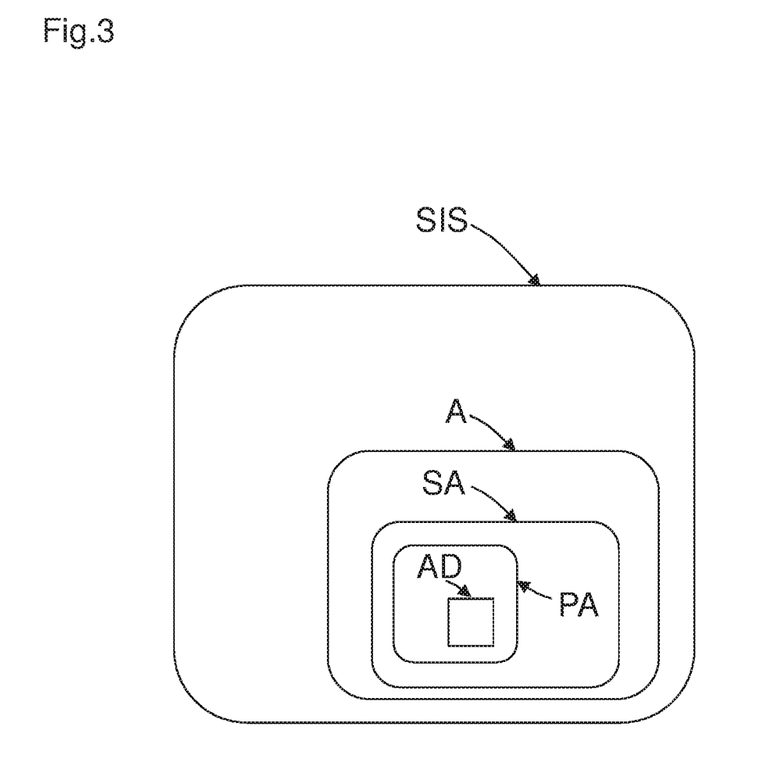
FIG. 3 shows a safety sensor with a sandbox.

In accordance with FIG. 3, the user program PA also includes application data AD which are equally provided by the user. The application data AD are, for example, production data, measurement data, storage data, etc.

In accordance with FIG. 1 and FIG. 2, the user program PA is executed directly by the respective evaluation unit A of the safety sensor SIS.

Provision is made in accordance with FIG. 2 that the safety sensor has, in addition to safety-related outputs OSSD, so-called "output safety switching device" outputs, in brief OSSD outputs, further non-safety related outputs NO and non-safety related additional information can be output on these non-safety-related outputs NO for automation purposes. Furthermore, inputs E are present to read in data and/or signals of a system or of a control.

In accordance with FIG. 3, a so-called sandbox SA is generated within the safe evaluation program of the evaluation unit A in which a user program PA of almost any design or user programs of almost any design can be operated without impairing the functional safety of the safety sensor SIS.

The user program PA can evaluate operating data in an application specific manner and can output results data calculated therefrom via a low-performance, inexpensive interface, for example to a downstream automation control of a system.

Figure 4:
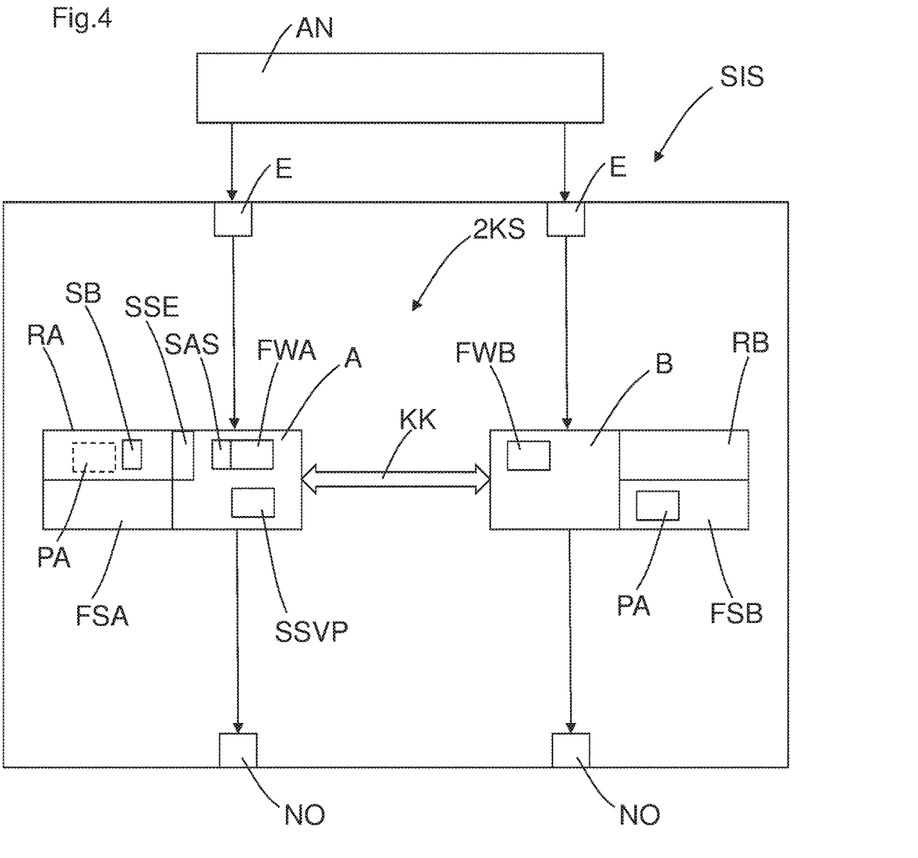
FIGS. 4 and 5 respectively diagrammatically illustrate the safety sensor with two evaluation units in different configurations.

In accordance with FIG. 4, the user program PA can, for example, be stored in the program memory FSB of the other channel or of the second evaluation unit B and the user program PA is transmitted over the communication channel KK into the random access memory RA of the first evaluation unit A. This naturally also applies conversely.

In accordance with FIG. 4, provision can optionally be made that the input data and output data of the user program PA takes place by direct access. In this respect, a specific memory region can be provided for the evaluation program FWA and for the user program PA.

The first evaluation unit A is optionally diverse from the second evaluation unit B. For example, the evaluation units A, B are formed by microcontrollers, microprocessors, digital signal processors, FPGAs, ASICs or similar components.

The first evaluation program FWA is optionally diverse from the second evaluation program FWB.

Provision is furthermore made in accordance with FIG. 4 that if an access attempt by the user program PA takes place to memory regions outside the permitted memory region, a memory protection violation program SSVP can be invoked by the evaluation unit A which executes the evaluation program FWA and the access to the memory region can be refused.

Furthermore, a part of the random access memory RA can be assigned to the user program PA in the random access memory RA of the associated evaluation unit A for utilization by the evaluation program FWA, with the memory protection device SSE being configured to restrict access of the user program PA only to this part of the random access memory RA. The memory protection device SSE can be checked cyclically.

The user program PA can be executed cyclically by the evaluation program FWA of the evaluation unit A, with the evaluation unit FWA having a higher priority than the user program PA. The evaluation program FWA thereby has complete control over the user program PA.

In accordance with FIG. 4, the evaluation program FWA has a software abstraction layer SAS which provides a selection of operating data of the safety sensor SIS in a memory region readable for the user program PA. For example, the beam data of the light grid L can be provided in this memory region.

Figure 5:
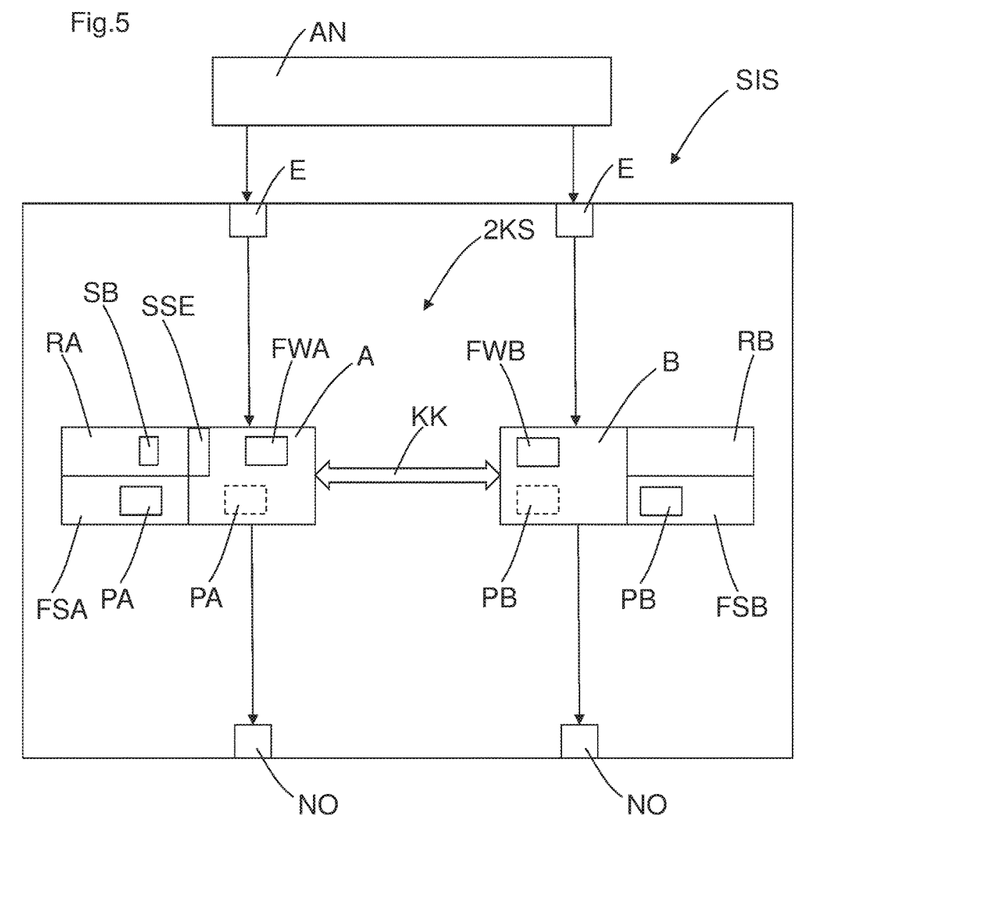

In accordance with FIG. 4 and FIG. 5, safe and/or non-safe data and/or signals from a system AN can be read into the evaluation unit A, B of the safety sensor SIS via inputs E of the safety sensor SIS. They are, in this respect, for example, muting signals for a muting application or output signals of a system for a measurement of objects OB. They can furthermore also, for example, be a band speed signal or band coder signal in accordance with an application from FIG. 2.

These data and/or signals are accessible to the user program PA, PB via the software abstraction layer SAS. It is thus possible, for example, to prepare a 2D image of objects OB for the classification using the safety sensor SIS or the safety light grid by means of a band speed signal or band position signal in accordance with the application of FIG. 2 forwarded to the safety sensor SIS, in particular to the safety light grid L, when the objects OB are moved past the safety sensor SIS or past the safety light grid.

The evaluation program FWA optionally has a software abstraction layer SAS which accepts results data of the user program PA from a memory region readable for the user program PA and output them to an interface and/or which keeps the results data ready for invoking for an external control. Subsequent controls can thereby be controlled or actuators can be controlled directly on the basis of the results of the user program PA.

In accordance with FIG. 5, the user program PA or PB can be stored in both program memories FSA, FSB or in both random access memories RA, RB, with both evaluation units A or B being configured to execute the user program PA, PB, with results of the user programs PA, PB being exchangeable between the evaluation units A, B over the communication channel KK.

In accordance with FIG. 5, the user program PA, PB is configured as a safety-relevant, application-specific program. A safe user program PA, PB can thereby be executed in the safety sensor SIS.

The user program PA, PB is then processed or executed in parallel on both evaluation units. The results of the user program PA, PB are compared and evaluated via the evaluation programs FWA, FWB of the two evaluation units A, B over the communication channel KK.

In accordance with FIG. 4 and FIG. 5, the results of the application program PA, PB or of the evaluation program FWA, FWB calculated over two channels can be output via an interface, a safety interface and/or outputs NO.

REFERENCE SYMBOLS

SIS safety sensor
A first evaluation unit
FWA first evaluation program
B second evaluation unit
FWB second evaluation program
2KS two-channel system
RA, RB random access memory
FSA, FSB program memory
KK communication channel
PA, PB user program
SSE memory protection device
SB memory region
SSVP memory protection violation program
SAS software abstraction layer
L light grid SE transmission unit
EE reception unit
LS light transmitter
LE light receiver
Ü monitored field
SA sandbox
OB object
E inputs
NO outputs
AN system
OSSD output safety switching devices

The invention claimed is:

1. A safety sensor, comprising:
a light grid, comprising:
   a plurality of light transmitters for respectively generating a plurality of light beams, the plurality of light beams being arrayed in a grid pattern; and
   a plurality of light receivers for respectively receiving the plurality of light beams, wherein a monitored field is defined between the plurality of light transmitters and the plurality of light receivers;
at least one first evaluation unit having a first evaluation program;
at least one second evaluation unit having a second evaluation program, wherein a two-channel system is formed, wherein the evaluation programs are closed programs tested in accordance with safety regulations or safety standards, with each of the first and second evaluation units being connected to a respective random access memory and with each of the first and second evaluation units having a respective program memory, with a bidirectional communication channel being arranged between the first and second evaluation units; and
at least one of the first and second evaluation units having a capability of receiving data and/or signals of a system or of a control and providing further non-safety related outputs or non-safety related additional information for output for automation purposes,
wherein a cross-comparison of the evaluation results between the first and second evaluation units is carried out, wherein a user program is stored in at least one of the two program memories and/or in one of the two random access memories, with the at least one of the first and second evaluation units which executes the user program having a memory protection device which is configured to restrict memory access of the user program to a defined memory region within the random access memory, the user program classifying an object moving through the monitored field as safe or non-safe.

2. The safety sensor in accordance with claim 1, wherein the safety sensor is configured to invoke a memory protection violation program by the one of the first and second evaluation units if an access attempt by the user program to memory regions outside the allowed memory region takes place, with the said one of the first and second evaluation units executing the evaluation program and with the safety sensor being configured to refuse the access to the memory region.

3. The safety sensor in accordance with claim 1, wherein the safety sensor is configured to assign a part of the random access memory to the user program in the random access memory of the associated one of the first and second evaluation units for use by the evaluation program, with the memory protection device being configured to restrict access of the user program only to this part of the random access memory.

4. The safety sensor in accordance with claim 1, wherein the safety sensor is configured to execute the user program cyclically by the evaluation program of the one of the first and second evaluation units, with the evaluation program having a higher priority than the user program.

5. A safety sensor, comprising:
a light grid, comprising:
   a plurality of light transmitters for respectively generating a plurality of light beams, the plurality of light beams being arrayed in a grid pattern; and
   a plurality of light receivers for respectively receiving the plurality of light beams, wherein a monitored field is defined between the plurality of light transmitters and the plurality of light receivers;
at least one first evaluation unit having a first evaluation program;
at least one second evaluation unit having a second evaluation program, wherein a two-channel system is formed, wherein the evaluation programs are closed programs tested in accordance with safety regulations or safety standards, with each of the first and second evaluation units being connected to a respective random access memory and with each of the first and second evaluation units having a respective program memory, with a bidirectional communication channel being arranged between the first and second evaluation units; and
at least one of the first and second evaluation units of the safety sensor through inputs of the safety sensor having a capability of receiving data and/or signals of a system or of a control and providing further non-safety related outputs or non-safety related additional information for output for automation purposes,
wherein a cross-comparison of the evaluation results between the first and second evaluation units is carried out, wherein a user program is stored in at least one of the two program memories and/or in one of the two random access memories, with the at least one of the first and second evaluation units which executes the user program having a memory protection device which is configured to restrict memory access of the user program to a defined memory region within the random access memory, the user program classifying an object moving through the monitored field as safe or non-safe,
and wherein the evaluation program has a software abstraction layer which provides a selection of operating data of the safety sensor in a memory region readable for the user program.

6. The safety sensor in accordance with claim 5, wherein data and/or signals are accessible to the user program via the software abstraction layer.

7. The safety sensor in accordance with claim 1, wherein the evaluation program has a software abstraction layer which accepts results data of the user program from a memory region writable for the user program and outputs them to an interface and/or keeps the results data ready for invoking for an external control.

8. The safety sensor in accordance with claim 1, wherein the user program can be stored in both program memories or in both random access memories, with both of the first and second evaluation units being configured to execute the user program, with results of the user program being exchangeable between the first and second evaluation units over the communication channel.

9. A method of using a safety sensor, comprising the steps of:
providing a light grid, the light grid having a plurality of light transmitters for respectively generating a plurality of light beams, the plurality of light beams being arrayed in a grid pattern, the light grid further having a plurality of light receivers for respectively receiving the plurality of light beams, wherein a monitored field is defined between the plurality of light transmitters and the plurality of light receivers;
providing at least one first evaluation unit having a first evaluation program;
providing at least one second evaluation unit having a second evaluation program;
forming a two-channel system, wherein the evaluation programs comprise closed programs tested in accordance with safety regulations or safety standards, with each of the first and second evaluation units being connected to a respective random access memory and with each of the first and second evaluation units having a respective program memory, with a bidirectional communication channel being arranged between the first and second evaluation units;
performing a cross-comparison of the evaluation results between the first and second evaluation units, wherein a user program is stored in at least one of the two program memories and/or in one of the two random access memories, with the at least one of the first and second evaluation units which executes the user program having a memory protection device which restricts memory access of the user program to a defined memory region within the random access memory;
classifying an object moving through the monitored field as safe or non-safe; and
receiving data and/or signals of a system or of a control and providing further non-safety related outputs or non safety related additional information for output for automation purposes.

10. The method in accordance with claim 9, wherein, if the user program attempts to access memory regions outside the permitted memory region, a memory protection violation program is invoked by the said one of the first and second evaluation units which executes the evaluation program and the access to the memory region is refused.

11. The method in accordance with claim 9, wherein a part of the random access memory is assigned to the user program in the random access memory of the associated evaluation unit for use by the evaluation program, with the memory protection device being configured to restrict access of the user program only to this part of the random access memory.

12. The method in accordance with claim 9, wherein the user program is executed cyclically by the evaluation program of the one of the first and second evaluation units, with the evaluation program having a higher priority than the user program.

13. The method in accordance with claim 9, wherein the evaluation program has a software abstraction layer which provides a selection operating data of the safety sensor in a memory region readable for the user program.

14. The method in accordance with claim 9, wherein the evaluation program has a software abstraction layer which accepts results data of the user program from a memory region writable for the user program and outputs them to an interface and/or keeps the results data ready for invoking for an external control.

15. The method in accordance with claim 9, wherein the user program is stored in both program memories or in both random access memories, and wherein both evaluation units execute the user program, with results of the user program being exchanged between the evaluation units via the communication channel.

* * * * *